United States Patent
Lindemann et al.

(10) Patent No.: US 9,822,826 B2
(45) Date of Patent: Nov. 21, 2017

(54) TORQUE CONVERTER INCLUDING STATOR THRUST BEARING

(71) Applicants: Schaeffler Technologies GmbH & Co. KG, Herzogenaurach (DE); Schaeffler Group USA, Inc., Fort Mill, SC (US)

(72) Inventors: Patrick Lindemann, Wooster, OH (US); Aditya Dattawadkar, Wooster, OH (US)

(73) Assignees: Schaeffler Technologies AG & Co. KG, Herzogenaurach (DE); Schaeffler Group USA, Inc., Fort Mill, SC (US)

( * ) Notice: Subject to any disclaimer, the term of this patent is extended or adjusted under 35 U.S.C. 154(b) by 302 days.

(21) Appl. No.: 14/566,924

(22) Filed: Dec. 11, 2014

(65) Prior Publication Data

US 2015/0184701 A1   Jul. 2, 2015

Related U.S. Application Data

(60) Provisional application No. 61/915,818, filed on Dec. 13, 2013.

(51) Int. Cl.
*F16D 33/18* (2006.01)
*F16C 17/10* (2006.01)
(Continued)

(52) U.S. Cl.
CPC ............ *F16D 33/18* (2013.01); *F16C 17/102* (2013.01); *F16C 33/1075* (2013.01);
(Continued)

(58) Field of Classification Search
CPC .... F16C 17/045; F16C 17/047; F16C 17/102; F16C 19/30; F16C 32/0662;
(Continued)

(56) References Cited

U.S. PATENT DOCUMENTS 5,829,338 A * 11/1998 Chrestoff ................ F04B 1/148
                                                                 384/121
6,231,309 B1   5/2001 Popoola et al.
(Continued)

OTHER PUBLICATIONS

International Search Report and Written Opinion of Corresponding PCT/US2014/069678.
(Continued)

*Primary Examiner* — Logan Kraft
(74) *Attorney, Agent, or Firm* — Davidson, Davidson & Kappel, LLC

(57) ABSTRACT

A torque converter is provided. The torque converter includes an impeller including an impeller shell, a turbine including a turbine shell and a stator axially between the turbine and the impeller. A first fluid flow is generated between the impeller and the stator and a second fluid flow is generated between the turbine and the stator. The torque converter further includes a thrust bearing axially between the impeller and the stator or axially between the turbine and the stator. The thrust bearing includes a bearing surface arranged for maintaining a hydrodynamic film thereon in a region of the first fluid flow or the second fluid flow during operation of the torque converter. A method of forming a torque converter is also provided.

20 Claims, 10 Drawing Sheets

(51) Int. Cl.
*F16C 33/10* (2006.01)
*F16H 45/02* (2006.01)
*F16H 41/24* (2006.01)

(52) U.S. Cl.
CPC ............ *F16H 41/24* (2013.01); *F16H 45/02* (2013.01); *F16H 2041/246* (2013.01); *F16H 2045/0205* (2013.01); *F16H 2045/0215* (2013.01); *F16H 2045/0226* (2013.01); *F16H 2045/0278* (2013.01); *F16H 2045/0289* (2013.01); *Y10T 29/4933* (2015.01)

(58) Field of Classification Search
CPC .. F16C 32/0681; F16C 33/1075; F16D 33/18; F16D 41/07; F16H 41/24; F16H 2041/246; F16H 45/02; F16H 2045/0205; F16H 2045/0215; F16H 2045/0226; F16H 2045/0231; F16H 2045/0278; F16H 2045/0289; Y10T 29/4933
See application file for complete search history.

(56) References Cited

U.S. PATENT DOCUMENTS

| | | | |
|---|---|---|---|
| 6,739,415 B2* | 5/2004 | Mitchell | E21B 17/1007 166/241.6 |
| 7,181,988 B2* | 2/2007 | Nagai | F16C 29/063 74/89.2 |
| 7,445,099 B2* | 11/2008 | Maucher | F16D 47/06 192/3.26 |
| 7,458,158 B2* | 12/2008 | Luo | B21D 53/10 29/527.1 |
| 7,866,454 B2* | 1/2011 | Saka | F16H 45/02 192/110 B |
| 8,042,272 B2* | 10/2011 | Welch | F16C 9/00 29/898.041 |
| 8,413,561 B2* | 4/2013 | Thielges | B21D 28/005 29/39 |
| 8,940,833 B2* | 1/2015 | Schmitt | C09J 167/03 428/355 R |
| 2007/0220875 A1 | 9/2007 | Akamatsu et al. | |
| 2008/0173510 A1 | 7/2008 | Saka | |
| 2008/0173512 A1 | 7/2008 | Kaneko et al. | |
| 2008/0227597 A1 | 9/2008 | Povirk et al. | |
| 2011/0132709 A1 | 6/2011 | Fukunaga et al. | |

OTHER PUBLICATIONS

*Machinery's Handbook*, 25th Edition, p. 2140.

* cited by examiner

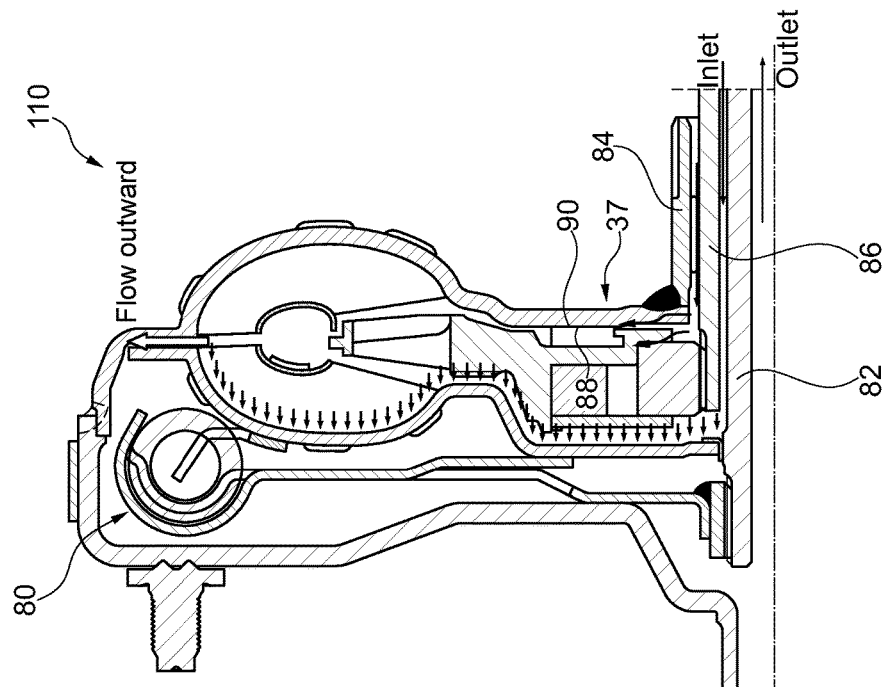
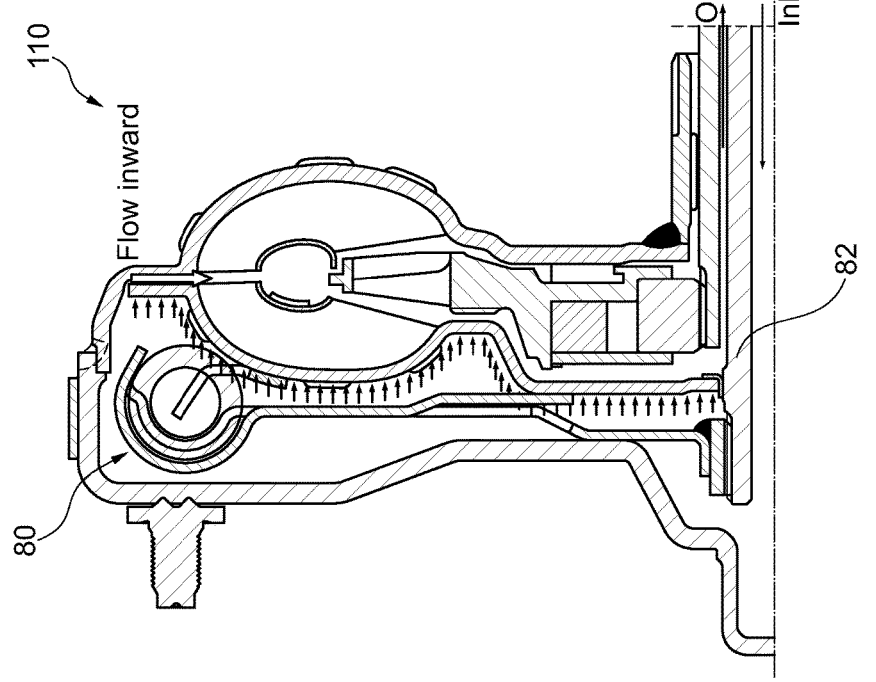

TORQUE CONVERTER INCLUDING STATOR THRUST BEARING

This claims the benefit to U.S. Provisional Patent Application No. 61/915,818, filed on Dec. 13, 2013, which is hereby incorporated by reference herein.

The present disclosure relates generally to torque converters and more specifically to bearings between stators and impellers in torque converters.

BACKGROUND

U.S. Pat. No. 6,231,309 discloses a torque converter reactor thrust washer.

Tapered land thrust bearings are known, as described at page 2140 of the 25$^{th}$ Edition of the *Machinery's Handbook*. Tapered land thrust bearings are not known to be used in torque converters, especially between a stator and impeller.

SUMMARY OF THE INVENTION

A torque converter is provided. The torque converter includes an impeller including an impeller shell, a turbine including a turbine shell and a stator axially between the turbine and the impeller. A first fluid flow is generated between the impeller and the stator and a second fluid flow is generated between the turbine and the stator. The torque converter further includes a thrust bearing axially between the impeller and the stator or axially between the turbine and the stator. The thrust bearing includes a bearing surface arranged for maintaining a hydrodynamic film thereon in a region of the first fluid flow or the second fluid flow during operation of the torque converter.

A method of forming a torque converter is also provided. The method includes providing a thrust bearing surface at a first fluid flow region axially between an impeller and a stator or at a second fluid flow region axially between a turbine and the stator such that a fluid flow maintains a hydrodynamic film on the trust bearing surface at the first fluid flow region or at the second fluid flow region during operation of the torque converter.

BRIEF DESCRIPTION OF THE DRAWINGS

The present invention is described below by reference to the following drawings, in which:

FIGS. 2a and 2b show cross-sectional side views illustrating the flow of fluid through a torque converter similar to the torque converter shown in FIG. 1;

FIG. 3b shows a cross-sectional view of the thrust bearing along A-A in FIG. 3a;

FIG. 4b shows a cross-sectional view of the thrust bearing along B-B in FIG. 4a;

DETAILED DESCRIPTION

The present disclosure provides a particular, ramped or tapered surface with an adjacent short flat surface forming a hydrodynamic bearing surface for a stator. In one embodiment the bearing surface is part of a separate component fixed to the stator, and another embodiment the surface is part of the stator casting. The tapered surface and flat surface are designed to maintain a hydrodynamic film of the torque converter fluid on the bearing surface, preventing metal-on-metal contact between the bearing surface and an inside axial surface of the impeller shell. The hydrodynamic fluid film develops due to the relative motion between the stator and pump, and pressure is generated due the fluid film which would react to the stator thrust force. Embodiments of the invention may be particularly advantageous for torque converters having axially movable turbines that engage and disengage to the impeller shell because thrust loads on the pump at the bearing surface may be significantly smaller (−50% less) than a conventional torque converter due to absence of turbine thrust. The bearing surface may also be advantageous for use in conventional torque converters having low thrust loads. The reaction force generated by fluid film may closely match the calculated thrust values. Embodiments of the present invention may also help in reducing axial dimension of torque converter.

Figure 1:
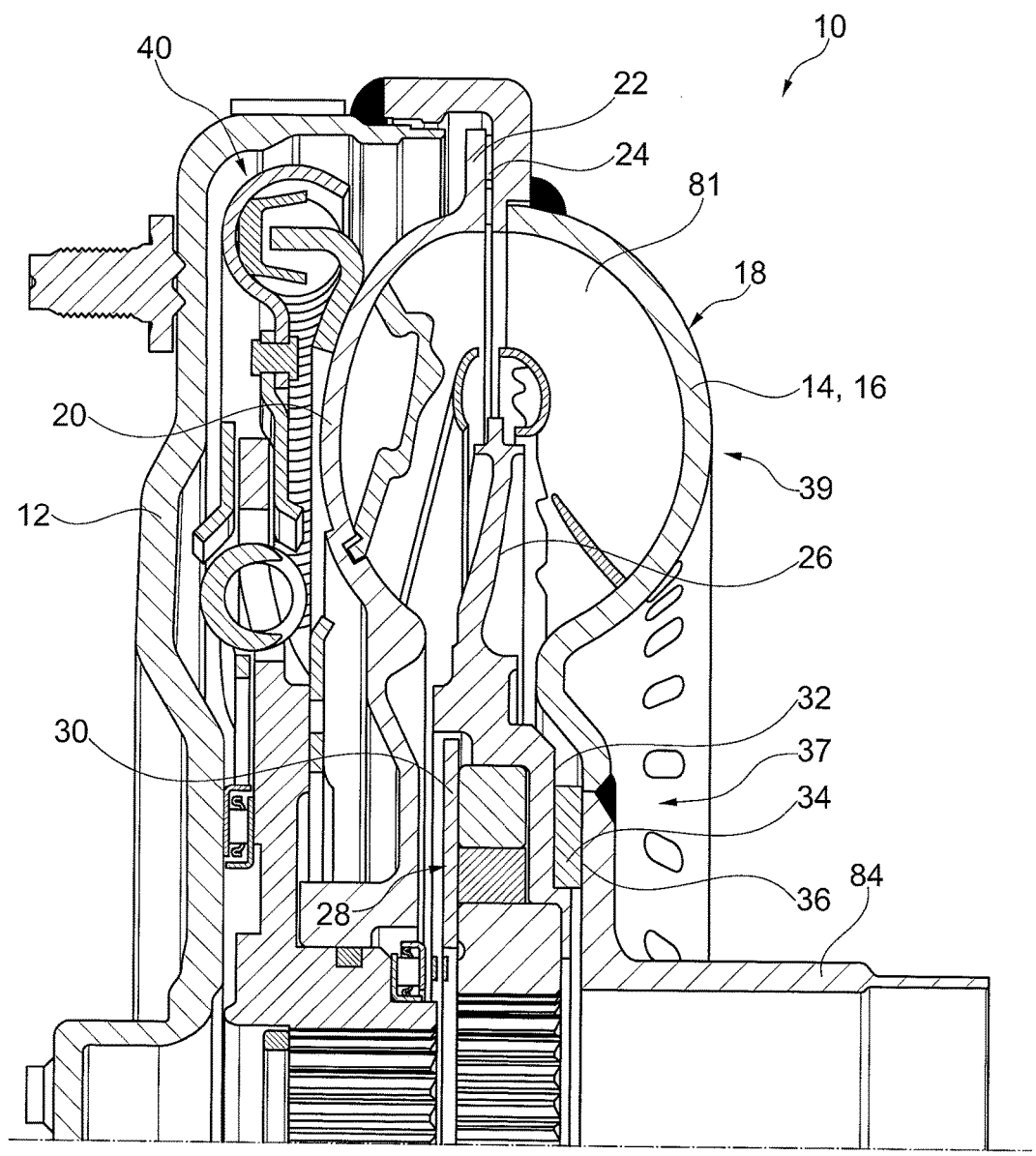
FIG. 1 shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes turbine 20 including an outer radial extension 22 radially protruding outwardly from an outer circumference of a blade supporting portion of turbine 20. Turbine 20 is configured to be axially slidable toward and away from impeller 18 to engage and disengage impeller 18. A friction material 24 is bonded onto a surface of outer radial extension 22 for engaging rear cover 14. Turbine 20 is connected to a damper assembly 40 that is circumferentially drivable by turbine 20 and is positioned between turbine 20 and front cover 12. Torque converter 10 also includes a stator 26 between turbine 20 and impeller 18 and a one-way clutch 28 supporting stator 26. A centering plate 30 holds one-way clutch 28 in place within stator 26. Stator 26 includes a base 32 and a thrust bearing 34 adjacent base 32 having a thrust bearing surface 36 that faces impeller shell 16. Specifically, thrust bearing surface 36 axially faces an axial surface of a radially extending portion 37 of impeller shell 16 that is between a rounded portion 39 supporting blades 81 of impeller 18 and a hub 84 of impeller 18. In this embodiment, bearing 34 is a tapered land thrust bearing. Bearing surface 36 is shaped so as to maintain a hydrodynamic film that prevents bearing surface 36 from contacting impeller shell 16. The hydrodynamic film provides sufficient pressure between the impeller shell 16 and stator 26 such that the force generated by the pressure of the hydrodynamic film is greater than the thrust force of stator 26 in the direction of impeller 18 during operation.

Thrust bearing 34 may be attached to a radially inner end of base 32 by snap fit connection and may include an anti-rotation feature, which may be integral with the snap fit connection or located separately. The anti-rotation feature may be a pin or a knob on thrusts bearing 34 able to take more load, and arranged as a pin-in-hole type arrangement with an adjacent surface or plane of base 32.

In an another embodiment, thrust bearing 34 may be connected to impeller shell 16 and thrust bearing surface 36 may axially face an axial surface of base 32 that faces impeller 18 such that thrust bearing surface 36 maintains a hydrodynamic film that prevents bearing surface 36 from contacting stator 26, specifically from contacting base 32. In such an embodiment, thrust bearing 34 may be attached to impeller shell 16 by snap fit connection and may include an anti-rotation feature, which may be integral with the snap fit connection or located separately.

FIGS. 2a and 2b show cross-sectional side views illustrating the flow of fluid through a torque converter 110 similar to torque converter 10 shown in FIG. 1. Torque converters 10, 110 include different damper assemblies 40, 80, respectively, and other shape variations, but the fluid flow described with respect to FIGS. 2a, 2b also applies to FIG. 1. FIG. 2a shows the flow of fluid through torque converter 10 when the lockup clutch is engaged via friction material 24 on outer radial extension 22 of turbine 20 being pressed against a radially extending portion of impeller shell 16. As shown in FIG. 2a, the fluid presses turbine 20 toward impeller 18 and flows radially inward through radially extending spaces formed in friction material 24. When the clutch is engaged, the fluid flows in through a transmission input shaft 82, through damper assembly 80, around outer radial extension 22 of turbine 20, in between turbine 20 and impeller 18 and around stator 26 to the fluid outlet.

FIG. 2b shows the flow of fluid through torque converter 10 when the clutch is disengaged via friction material 24 on outer radial extension 22 of turbine 20 not being pressed against the radially extending portion of impeller shell 16. As shown in FIG. 2b, the fluid presses turbine 20 away from impeller 18 and flows radially outward between friction material 24 and impeller shell 16. When the lockup clutch is disengaged, the fluid flows between an impeller hub 84 and transmission input shaft 82, on both radial sides of a stator shaft 86, through a gap formed by an axial surface 88 of thrust bearing 34 and an axial surface 90 of portion 37 of impeller shell 16, in between turbine 20 and impeller 18, radially outward around outer radial extension of turbine 20, back through damper assembly 80 and axially through the inside of transmission input shaft 82 to the fluid outlet. As fluid flows through the gap formed by axial surface 88 of thrust bearing 34 and axial surface 90 of impeller 18, a fluid film is formed on axial surface 88 that generates a sufficient force that overcomes the thrust force of stator 26 and prevents axial surface 88 of thrust bearing 34 from contacting axial surface 90 of impeller 18.

Figure 3A:
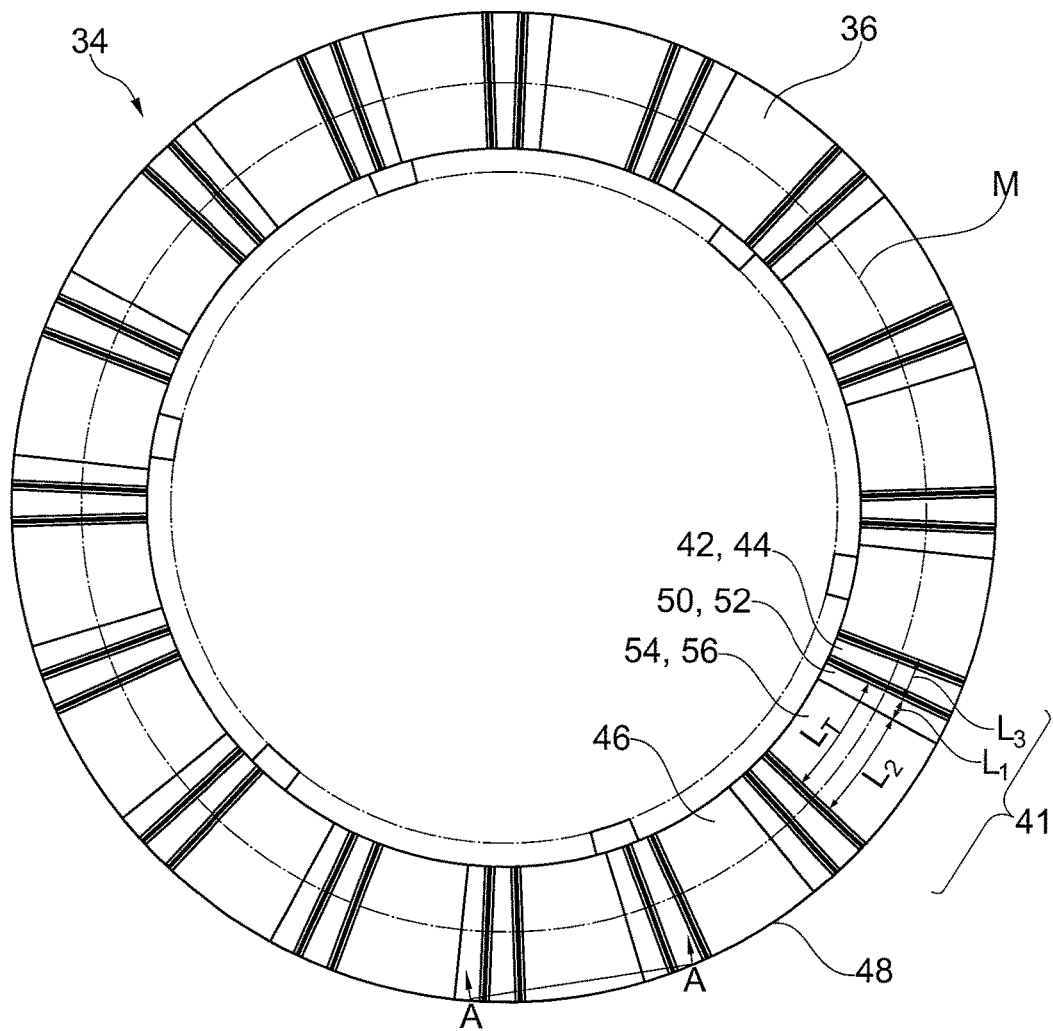
FIG. 3a shows a perspective view of a thrust bearing for use between a stator and an impeller of the torque converter in accordance with an embodiment of the present invention.

FIG. 3a shows a perspective view of thrust bearing 34 for use between stator 26 and impeller shell 16 in accordance with an embodiment of the present invention. In this embodiment, thrust bearing 34 is formed of non-hardened aluminum and accordingly includes a non-hardened aluminum thrust surface 36. Thrust bearing 34 includes a plurality of repeating circumferential sections 41, each including a first or grooved portion 42 including a groove 44 extending from an inner circumferential surface 46 of thrust bearing 34 to an outer circumferential surface 48 of thrust bearing 34, a second or flat portion 50 including a flat surface 52 of uniform thickness, and a third or tapered portion 54 including a tapered surface 56 circumferentially between groove 44 and flat surface 52. Tapered portion 54 gradually decreases in thickness as tapered surface 56 extends circumferentially from flat surface 52 to groove 44. Second or flat portion 50 is of a first circumferential length L1 and third portion 54 is of a second circumferential length L2, with first circumferential length L1 being less than second circumferential length L2. Second portion 50 and third portion 54 together have a total circumferential length LT (LT=L1+L2). In preferred embodiments, to form an optimal fluid film on thrust bearing surface 36, circumferential length L1 of flat portion 50 is 20% to 30% of total circumferential length LT (0.20–0.30*LT) and circumferential length L2 of tapered portion 54 is 70% to 80% of total circumferential length LT. As used herein, circumferential length refers to the average circumferential length, i.e., the circumferential length at a radial middle M of thrust bearing 34.

Figure 3B:
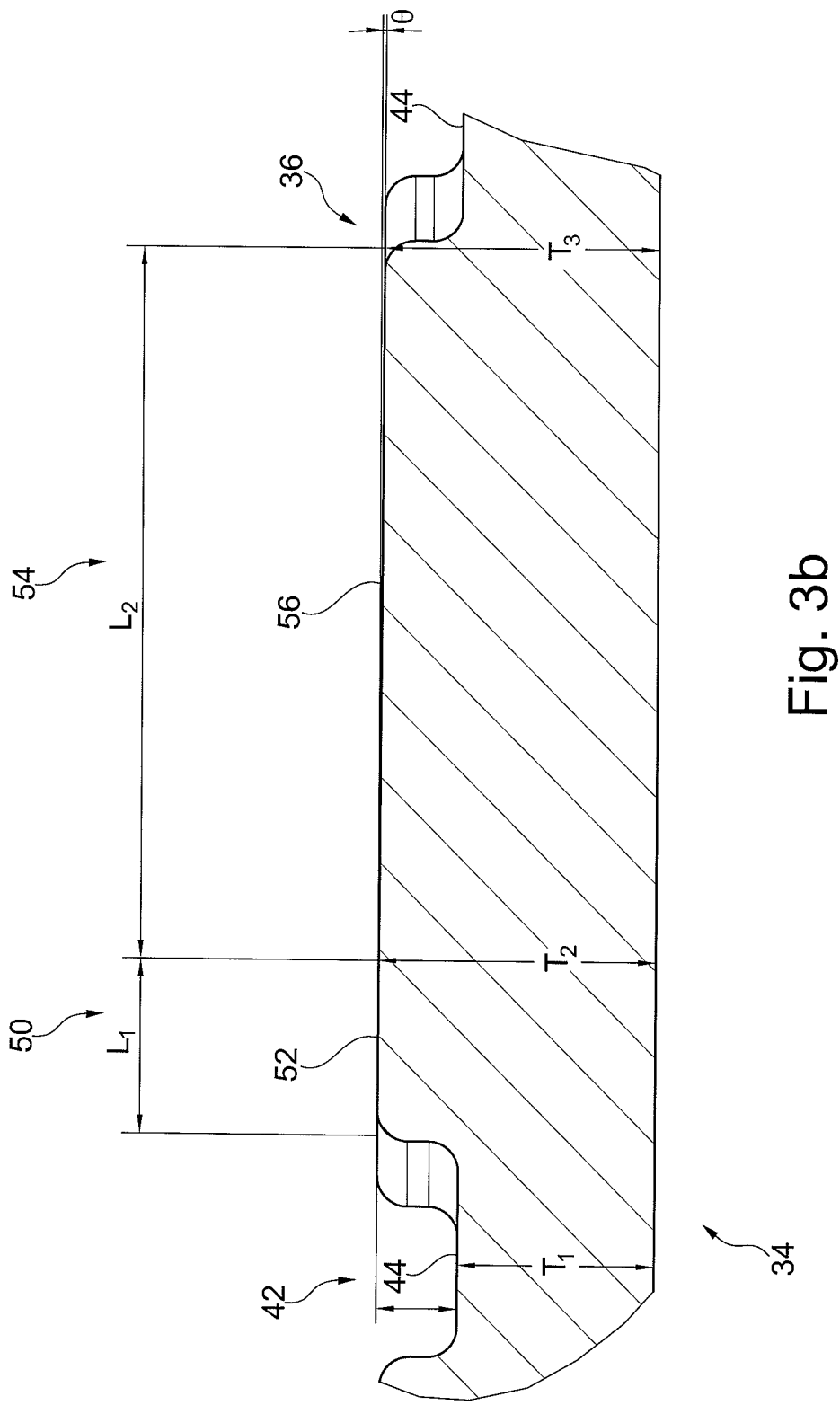

FIG. 3b shows a cross-sectional view of thrust bearing 34 along A-A in FIG. 3a having thrust surface 36. As shown in FIG. 3b, first or grooved portion 42 is of a first thickness T1, flat portion 50 is of a second thickness T2 and tapered portion 54 has a varying thickness that decreases from second thickness to a third thickness T3 as tapered surface 56 extends circumferentially from flat surface 52 to groove 44. In this embodiment, tapered surface 56 is tapered at an angle θ of less than 1°, preferably between 0.30° and 0.42°.

Figure 4A:
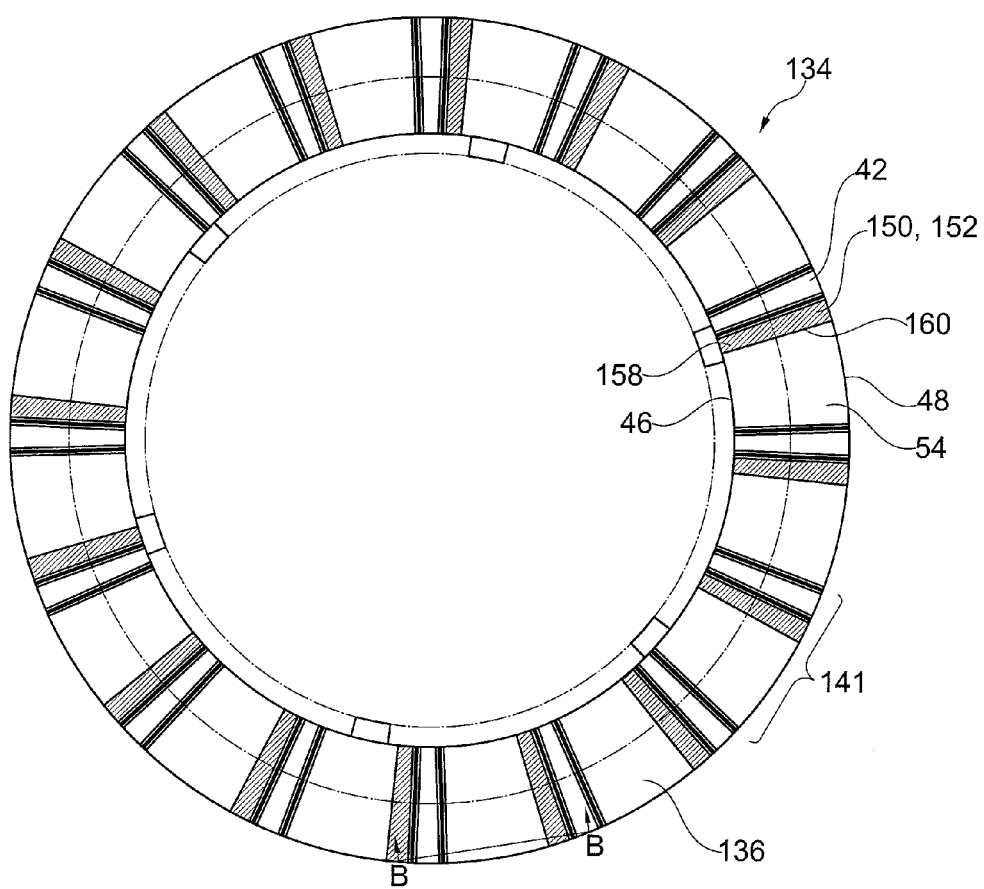
FIG. 4a shows a perspective view of a thrust bearing for use between a stator and an impeller of the torque converter in accordance with another embodiment of the present invention.
Figure 4B:
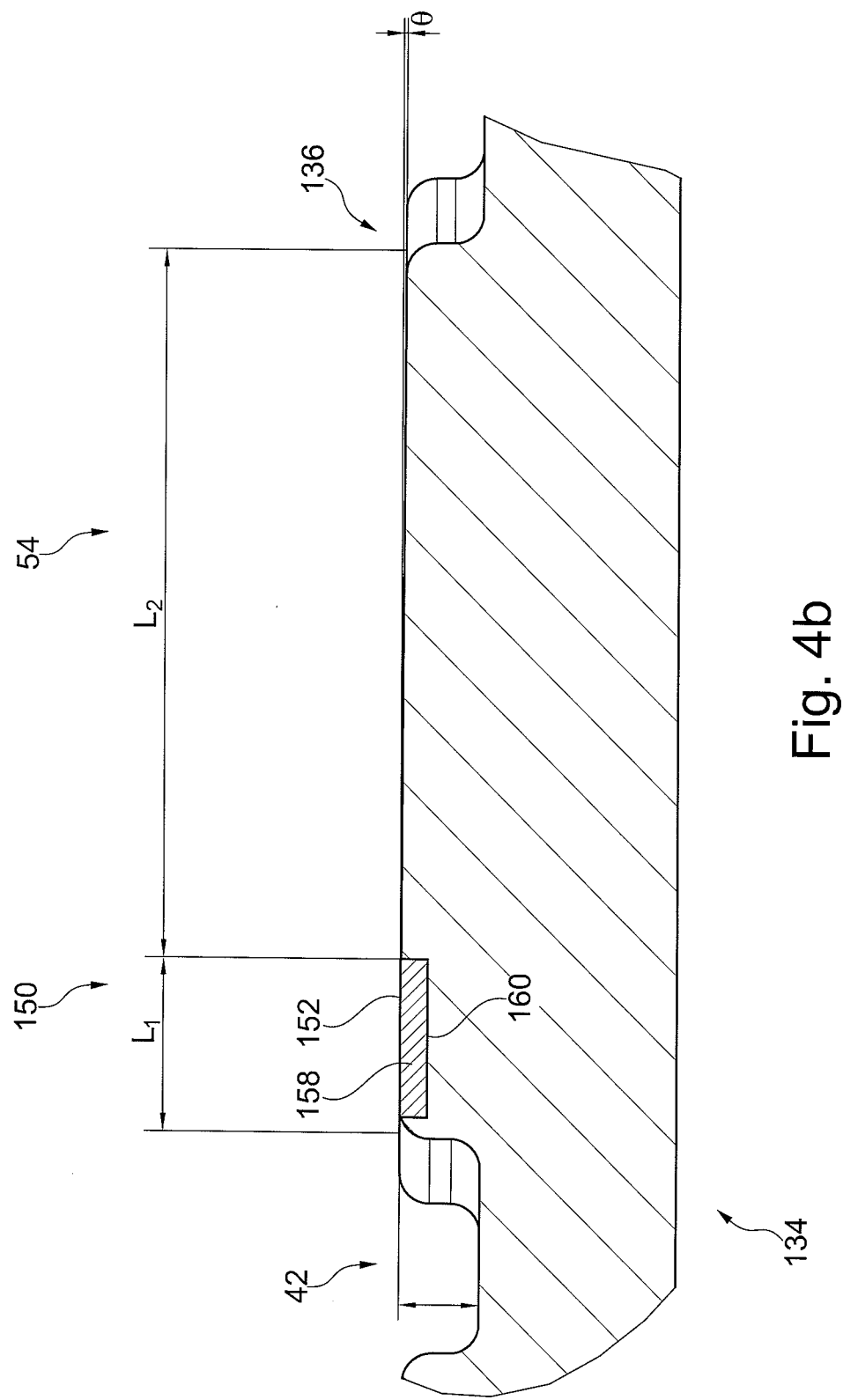

FIG. 4a shows a perspective view of thrust bearing 134 for use between stator 26 and impeller shell 16 in accordance with another embodiment of the present invention. FIG. 4b shows a cross-sectional view of thrust bearing 134 along B-B in FIG. 4a. Thrust bearing 134 includes a bearing surface 136 and is configured in substantially the same manner as thrust bearing 34, with a plurality of repeating circumferential sections 141, each including grooved portion 42 and tapered portion 54. The only difference from thrust bearing 34 is that thrust bearing 134 includes a flat portion 150 having a flat surface 152 formed of a wear resistant material 158 in place of flat portion 50. In a preferred embodiment, wear resistant material 158 is a wear resistant plastic, for example a polyether ether ketone (PEEK) or a polyamide-imide produced by TORLON. Wear resistant material 158 may be applied to the non-hardened aluminum material of thrust bearing 34 by a pressure sensitive adhesive. To provide wear resistant material 158 to form flat surface 152, slots 160 extending from inner circumferential surface 46 to outer circumferential surface 48 may be machined into flat portion 150 and a strip of material 158 is attached to bearing 34 in each of slots 160.

Figure 5:
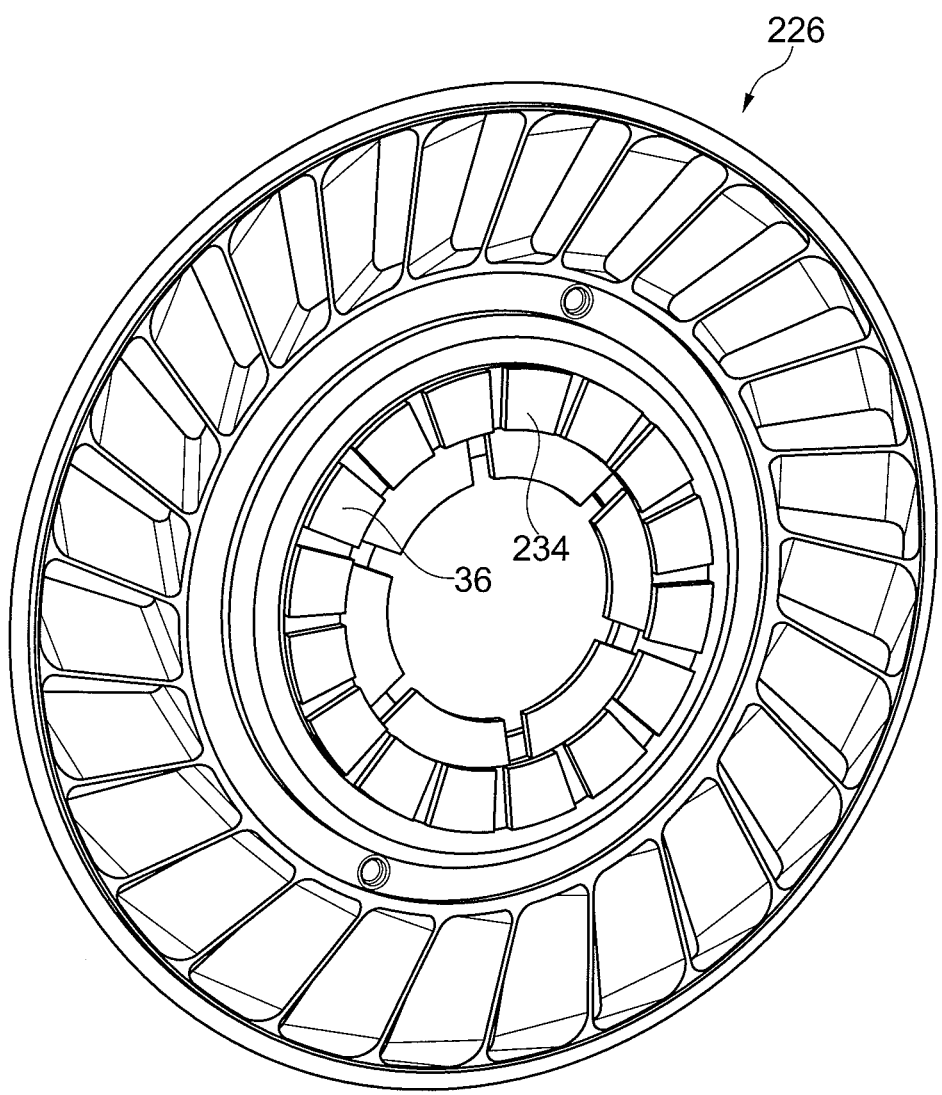
FIG. 5 shows a stator including a thrust bearing formed integrally thereon.

FIG. 5 shows a stator 226 including a thrust bearing 234 formed integrally thereon. The only difference between thrust bearing 234 and thrust bearing 34 is that, in contrast to thrust bearing being a distinct piece from stator 26, thrust bearing 234 is formed integrally with stator 226.

Figure 6:
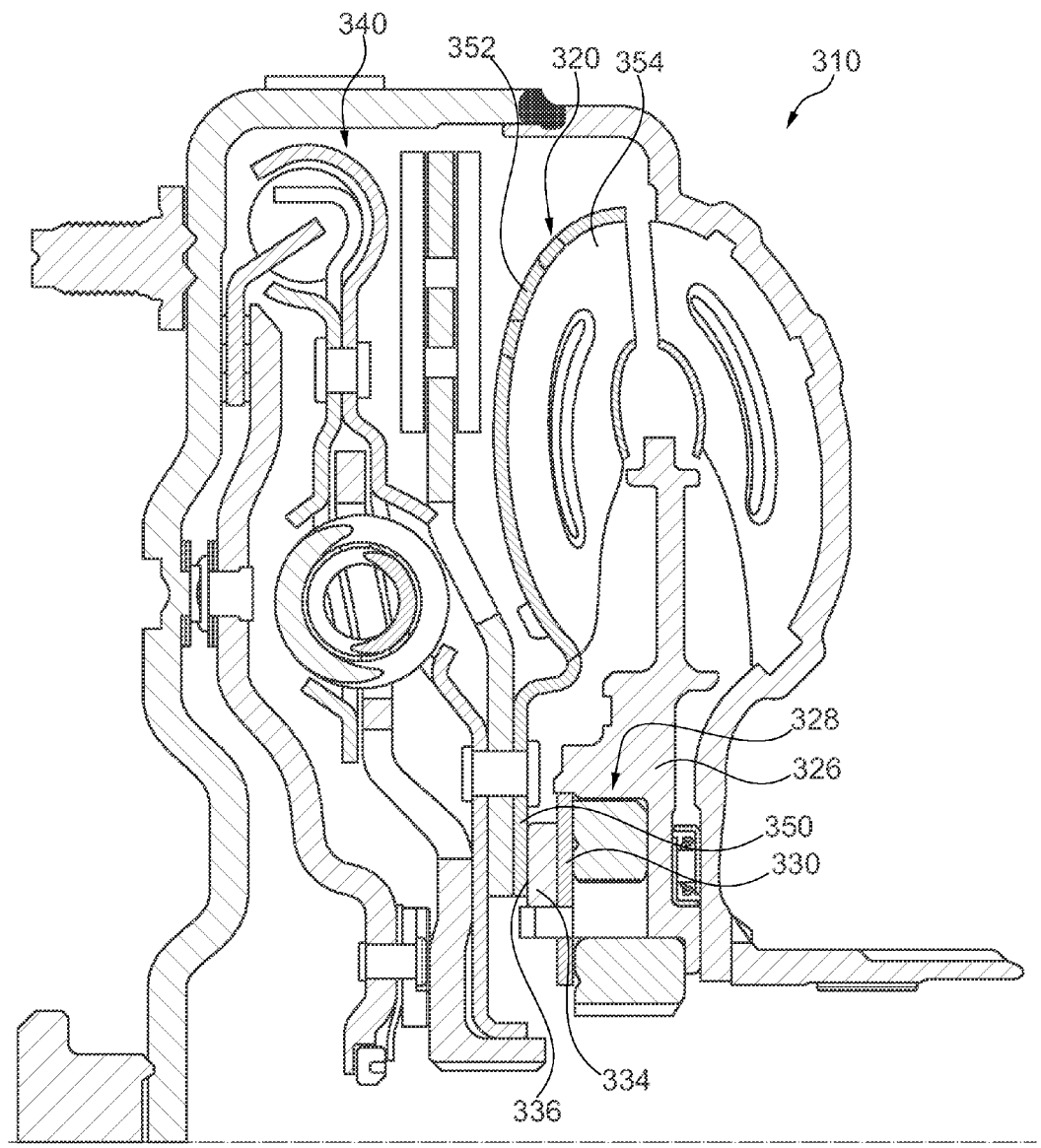
FIG. 6 shows a cross-sectional side view of a torque converter in accordance with another embodiment of the present invention.
Figure 7:
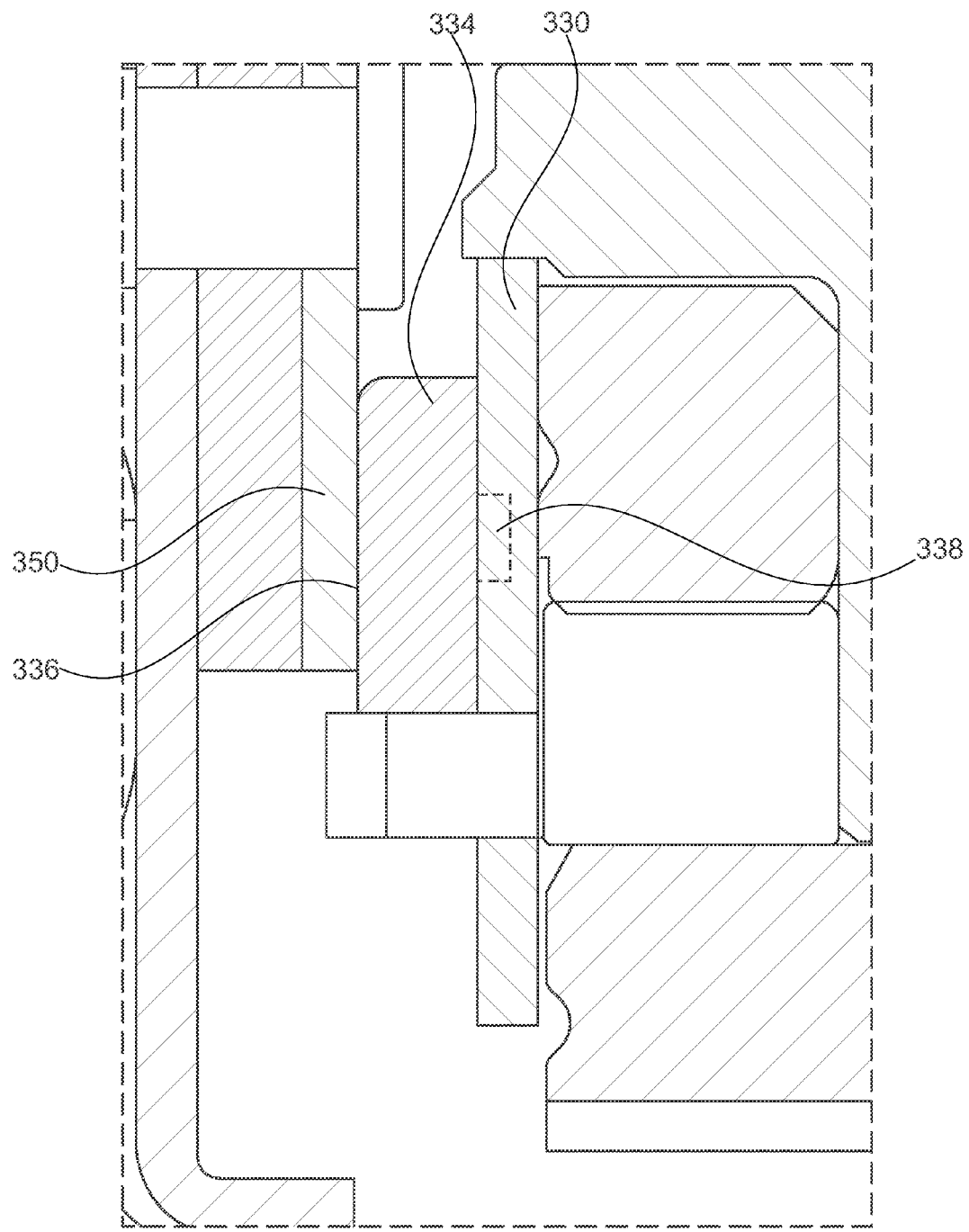
FIG. 7 shows an enlarged view of a thrust bearing region of the torque converter shown in FIG. 6.

FIG. 6 shows a cross-sectional side view of a torque converter 310 in accordance with another embodiment of the present invention and FIG. 7 shows an enlarged view of a thrust bearing region of torque converter 310. Torque converter 310 is configured in the same manner as torque converter 10 except that torque converter 310 includes a thrust bearing 334 held on a turbine side of a stator 326 axially between stator 326 and a turbine 320, which is fixed to a damper 340. Thrust bearing 334 may be configured in the same manner as thrust bearings 34, 134 and connected to stator 326 by a centering plate 330, which holds a one-way clutch 328 in place within stator 326. Thrust bearing 334 includes a thrust bearing surface 336, which may be formed in the same manner as one of thrust bearing surface 36, 136, that faces turbine 320. Specifically, thrust bearing surface 336 axially faces an axial surface of a radially extending portion 350 of a turbine shell 352 of turbine 320. Radially extending portion 350 extends radially inward from a rounded portion 352 supporting blades 354 of turbine 320. Bearing surface 336 is shaped so as to maintain a hydrodynamic film that prevents bearing surface 336 from contacting turbine shell 352. The hydrodynamic film provides sufficient pressure between turbine shell 352 and stator 326 such that the force generated by the pressure of the hydrodynamic film is greater than the thrust force of stator 326 in the direction of turbine 320 during operation.

As schematically shown in FIG. 7, thrust bearing 334 may be attached to centering plate 330 by snap fit connection and may include an anti-rotation feature 338, which may be integral with the snap fit connection or located separately. The anti-rotation feature 338 may be a pin or a knob on thrusts bearing 334 able to take more load, and arranged as a pin-in-hole type arrangement with an adjacent surface or plane of centering plate 330.

Figure 8:
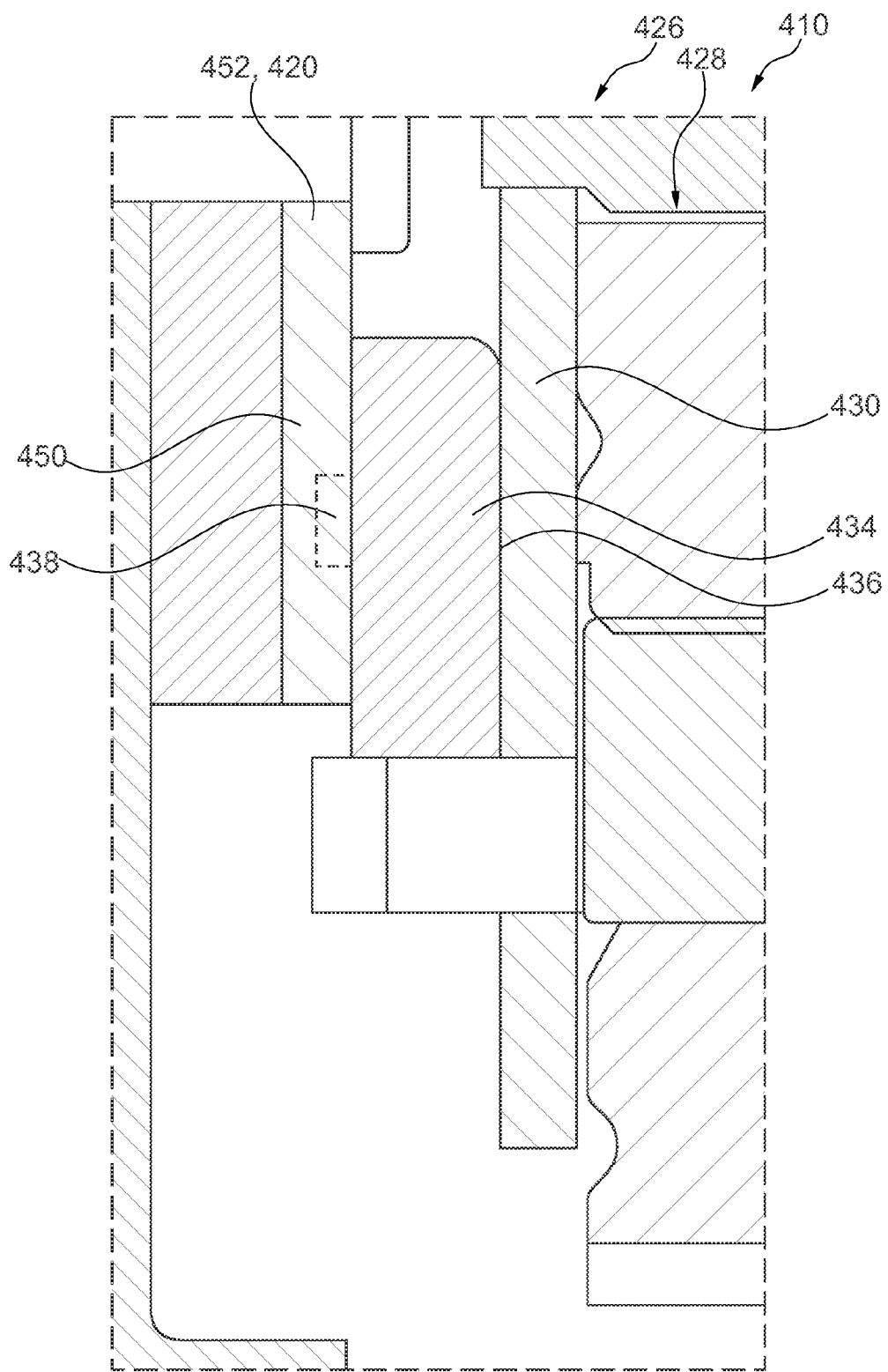
FIG. 8 shows an enlarged view of a thrust bearing region of a torque converter in accordance with another embodiment of the present invention.

FIG. 8 shows an enlarged view of a thrust bearing region of a torque converter 410 in accordance with another embodiment of the present invention. Torque converter 410 is configured in the same manner as torque converter 310 except that torque converter 410 includes a thrust bearing 434 held on a radially extending portion 450 of a turbine shell 452 of a turbine 420 axially between turbine 420 and a stator 426. Thrust bearing 434 may be configured in the same manner as thrust bearings 34, 134 and includes a thrust bearing surface 436, which may be formed in the same manner as one of thrust bearing surface 36, 136, that faces stator 426. Specifically, thrust bearing surface 436 axially faces a centering plate 430, which holds a one-way clutch 428 in place within stator 426. Bearing surface 436 is shaped so as to maintain a hydrodynamic film that prevents bearing surface 436 from contacting stator 426, specifically from contacting centering plate 430. The hydrodynamic film provides sufficient pressure between turbine shell 452 and stator 426 such that the force generated by the pressure of the hydrodynamic film is greater than the thrust force of stator 426 in the direction of turbine 420 during operation.

Thrust bearing 434 may be attached to radially extending portion 450 by snap fit connection and may include an anti-rotation feature 438, which may be integral with the snap fit connection or located separately. The anti-rotation feature 438 may be a pin or a knob on thrusts bearing 434 able to take more load, and arranged as a pin-in-hole type arrangement with an adjacent surface or plane of radially extending portion 450.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
an impeller including an impeller shell;
a turbine including a turbine shell, the turbine shell including a blade supporting portion and an outer radial extension radially protruding outwardly from an outer circumference of the blade supporting portion, the turbine being axially slidable toward and away from the impeller to directly engage and disengage the impeller via a friction material at the outer radial extension;
a stator axially between the turbine and the impeller, a first fluid flow being generated between the impeller and the stator, a second fluid flow being generated between the turbine and the stator; and
a thrust bearing axially between the impeller and the stator, the thrust bearing including a bearing surface, the bearing surface arranged and configured for maintaining a hydrodynamic film thereon in a region of the first fluid flow during operation of the torque converter, the thrust bearing including a plurality of circumferential sections, each circumferential section including a first portion including a groove extending from an inner circumferential surface of the thrust bearing to the outer circumferential surface of the thrust bearing, a second portion including a flat surface of uniform thickness, and a third portion including a tapered surface circumferentially between the groove and the flat surface, the third portion gradually decreasing in thickness as the tapered surface extends circumferentially from the flat surface to the groove,
the second portion being of a first circumferential length and the third portion being of a second circumferential length, the first circumferential length being less than the second circumferential length,
the second portion and third portion together having a total circumferential length, the first circumferential length being 20% to 30% of the total circumferential length and the second circumferential length being 70% to 80% of the total circumferential length.

2. The torque converter as recited in claim 1 wherein the flat surface is formed by a wear resistant material provided in a slot in the second portion of the thrust bearing.

3. The torque converter as recited in claim 2 wherein the wear resistant material is attached in the slot via pressure sensitive adhesive.

4. The torque converter as recited in claim 2 wherein the wear resistant material is a plastic.

5. The torque converter as recited in claim 4 wherein the plastic is a polyether ether ketone or a polyamide-imide.

6. The torque converter as recited in claim 1 wherein the thrust bearing is formed integrally on the stator.

7. The torque converter as recited in claim 1 wherein the thrust bearing surface is a non-hardened aluminum thrust surface.

8. A method of forming a torque converter comprising:
providing an impeller including an impeller shell;
providing a turbine including a turbine shell, the turbine shell including a blade supporting portion and an outer radial extension radially protruding outwardly from an outer circumference of the blade supporting portion, the turbine being axially slidable toward and away from the impeller to directly engage and disengage the impeller via a friction material at the outer radial extension;
providing a stator axially between the turbine and the impeller; and
providing a thrust bearing surface at a first fluid flow region axially between the impeller and the stator such that a fluid flow maintains a hydrodynamic film on the thrust bearing surface at the first fluid flow region during operation of the torque converter,
the thrust bearing surface being formed on a thrust bearing including a plurality of circumferential sections, each circumferential section including a first portion including a groove extending from an inner circumferential surface of the thrust bearing to the outer circumferential surface of the thrust bearing, a second portion including a flat surface of uniform thickness, and a third portion including a tapered surface circumferentially between the groove and the flat surface, the third portion gradually decreasing in thickness as the tapered surface extends circumferentially from the flat surface to the groove such that the tapered surface forms an angle of less than 1° with the flat surface.

9. The method as recited in claim 8 wherein the second portion is of a first circumferential length and the third portion is of a second circumferential length, the first circumferential length being less than the second circumferential length.

10. The torque converter as recited in claim 9 wherein the second portion and third portion together have a total circumferential length, the first circumferential length being 20% to 30% of the total circumferential length and the second circumferential length being 70% to 80% of the total circumferential length.

11. The method as recited in claim 8 further comprising machining a slot in the second portion of the thrust bearing to form a slot and providing wear resistant material in the slot to form the flat surface.

12. The method as recited in claim 11 wherein the providing wear resistant material in the slot includes attaching the wear resistant material via pressure sensitive adhesive.

13. The method as recited in claim 11 wherein the wear resistant material is a plastic.

14. The method as recited in claim 13 wherein the plastic is a polyether ether ketone or a polyamide-imide.

15. The method as recited in claim 8 further comprising forming the thrust bearing surface on the stator, on the impeller or on the turbine.

16. The method as recited in claim 8 wherein the thrust bearing surface is a non-hardened aluminum thrust surface.

17. The method as recited in claim 8 wherein the tapered surface extends circumferentially from the flat surface to the groove such that the tapered surface forms an angle of between 0.30° and 0.42° with the flat surface.

18. A torque converter comprising:
an impeller including an impeller shell;
a turbine including a turbine shell, the turbine shell including a blade supporting portion and an outer radial extension radially protruding outwardly from an outer circumference of the blade supporting portion, the turbine being axially slidable toward and away from the impeller to directly engage and disengage the impeller via a friction material at the outer radial extension; and
a stator axially between the turbine and the impeller, a first fluid flow being generated between the impeller and the stator, a second fluid flow being generated between the turbine and the stator; and
a thrust bearing axially between the impeller and the stator, the thrust bearing including a bearing surface, the bearing surface arranged and configured for maintaining a hydrodynamic film thereon in a region of the first fluid flow during operation of the torque converter, the thrust bearing including a plurality of circumferential sections, each circumferential section including a first portion including a groove extending from an inner circumferential surface of the thrust bearing to the outer circumferential surface of the thrust bearing, a second portion including a flat surface of uniform thickness, and a third portion including a tapered surface circumferentially between the groove and the flat surface, the third portion gradually decreasing in thickness as the tapered surface extends circumferentially from the flat surface to the groove,
the thrust bearing being connected to the stator.

19. The torque converter as recited in claim 18 wherein the flat surface is formed by a wear resistant material provided in a slot in the second portion of the thrust bearing.

20. The torque converter as recited in claim 18 wherein flat surface is formed of non-hardened aluminum.

* * * * *